United States Patent [19]

Luciani et al.

[11] Patent Number: 5,241,486
[45] Date of Patent: Aug. 31, 1993

[54] METHODS AND APPARATUS FOR MARKING AND IDENTIFYING HOOKS OF ELECTRIC MOTORS

[75] Inventors: Sabatino Luciani; Massimo Lombardi, both of Florence, Italy

[73] Assignee: Axis U.S.A., Inc., Marlborough, Mass.

[21] Appl. No.: 841,083

[22] Filed: Feb. 25, 1992

Related U.S. Application Data

[63] Continuation of Ser. No. 444,035, Nov. 30, 1989, Pat. No. 5,122,975.

[51] Int. Cl.[5] ............... H02K 13/04; H01R 39/32
[52] U.S. Cl. ........................ 364/550; 29/735; 29/736; 29/593; 29/597; 310/234
[58] Field of Search ............ 364/474.07, 550; 29/597, 598, 735, 736, 593; 310/234

[56] References Cited

U.S. PATENT DOCUMENTS

| | | | |
|---|---|---|---|
| 3,781,981 | 1/1974 | Miura et al. | 29/597 |
| 3,783,501 | 1/1974 | Biddison et al. | 29/597 |
| 3,950,630 | 4/1976 | Warner | 219/91 |
| 4,001,539 | 1/1977 | Franchi et al. | 219/110 |
| 4,437,229 | 3/1984 | Bitler et al. | 29/593 |
| 4,484,056 | 11/1984 | Rossell | 219/86.51 |
| 4,562,330 | 12/1985 | Hamilton | 219/110 |
| 4,835,430 | 5/1989 | Siu | 310/234 |
| 5,063,279 | 11/1991 | Rossi | 219/86.51 |

FOREIGN PATENT DOCUMENTS 1274644 4/1988 Japan .
2105527 3/1983 United Kingdom .

*Primary Examiner*—Vincent N. Trans
*Attorney, Agent, or Firm*—Robert R. Jackson; Robert W. Morris

[57] ABSTRACT

Methods and apparatus for marking and identifying a commutator hook of an electric motor are provided. A preselected commutator hook is marked by deforming the hook while the armature is in a winding machine, with a known angular position. The marked hook is identified by apparatus which determines whether or not the hook has been deformed while in the winding machine, and thereby recognizing the hook.

10 Claims, 11 Drawing Sheets

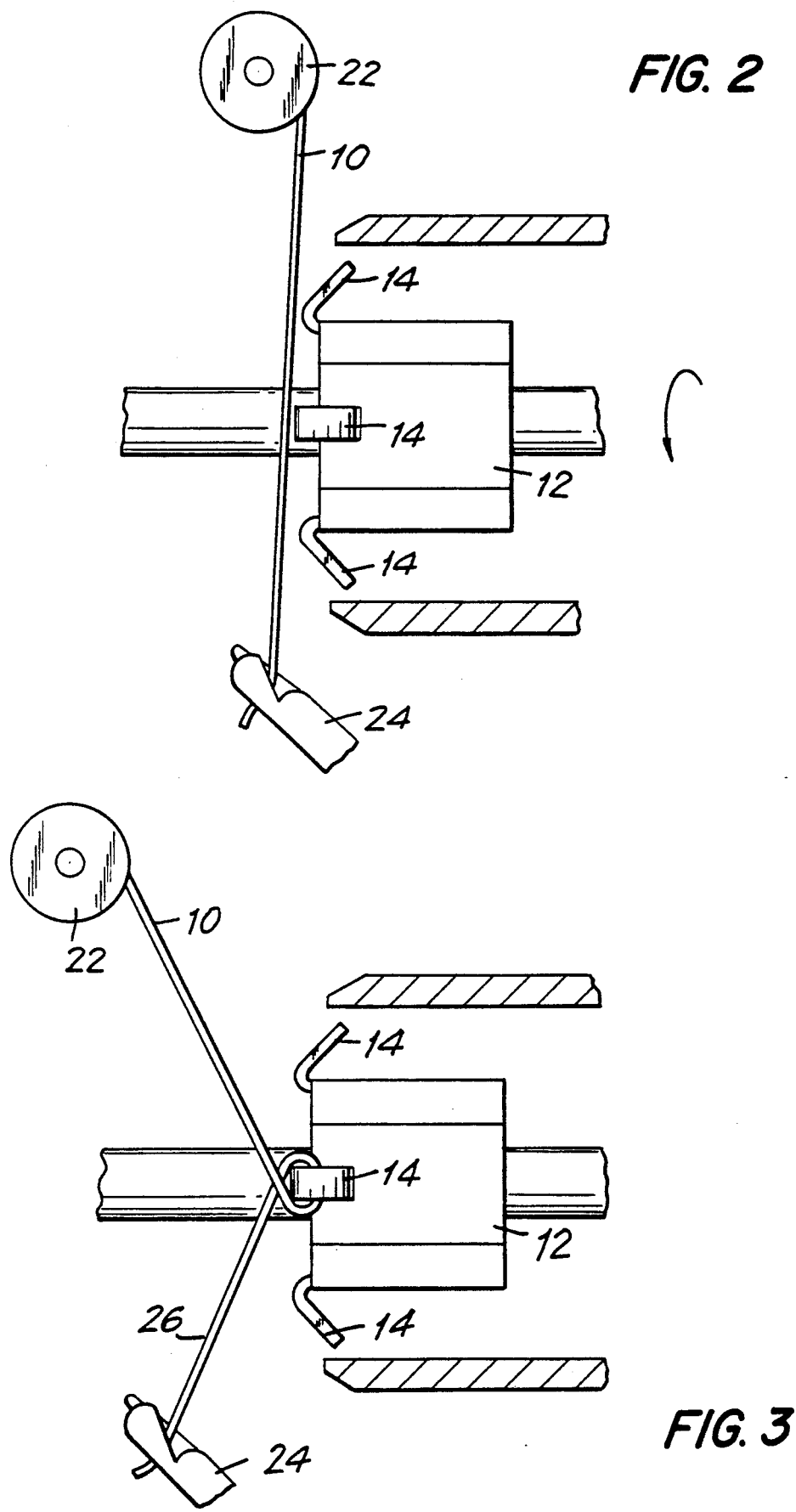

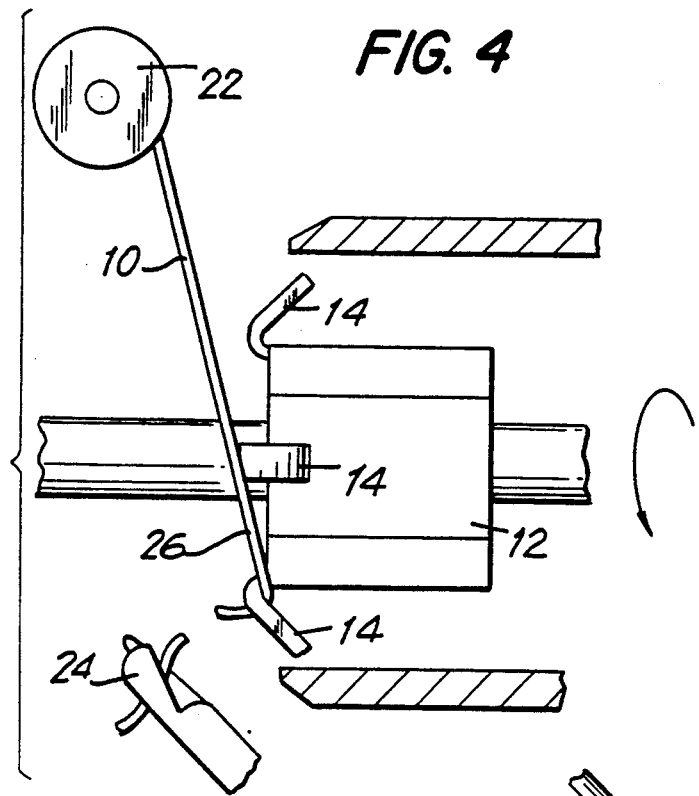
FIG. 4
FIG. 4A
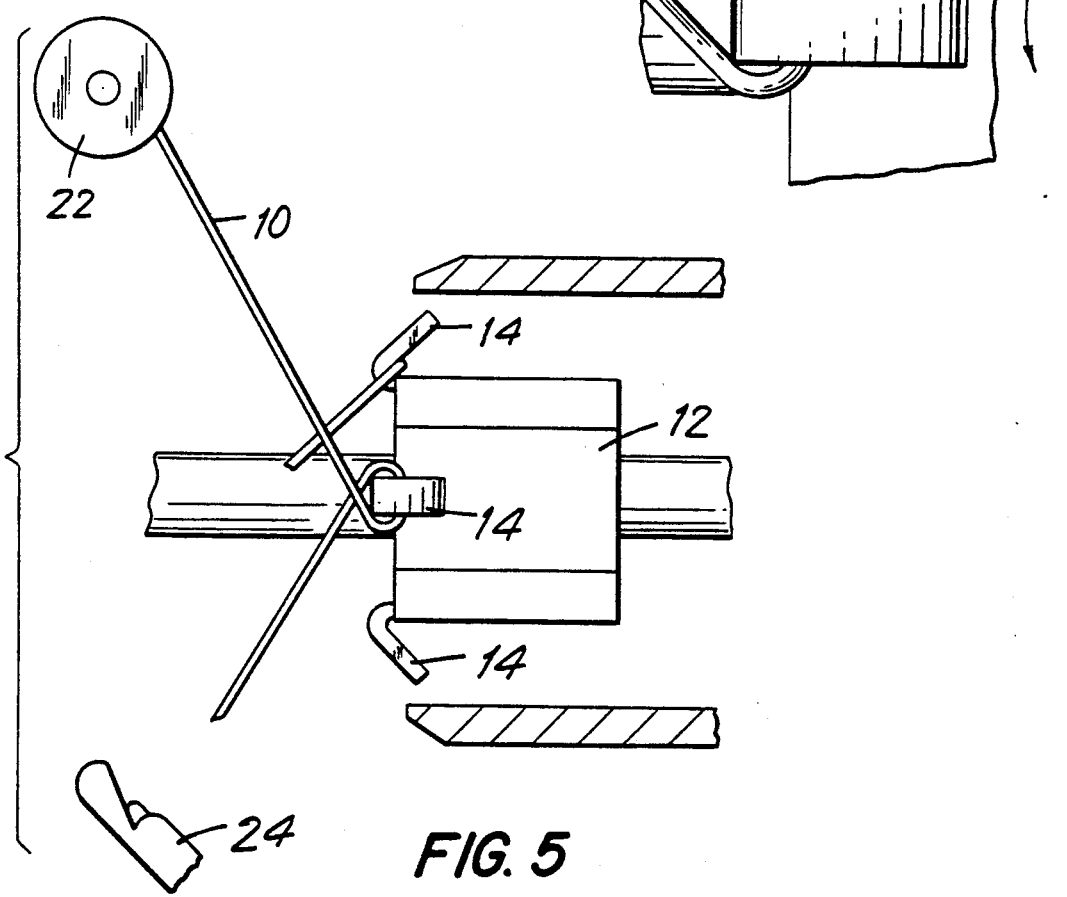
FIG. 5

METHODS AND APPARATUS FOR MARKING AND IDENTIFYING HOOKS OF ELECTRIC MOTORS

This is a continuation of application Ser. No. 07/444,035, filed Nov. 30, 1989, now U.S. Pat. No. 5,122,975.

BACKGROUND OF THE INVENTION

The present invention relates to armature winding machines, and, more particularly, to machines for winding the armature wires of an electric motor to a hook member ("tang") of a commutator bar and deforming selected hook members for later identification during processing.

Although armature winding machines are widely used, a system for marking and later identifying commutator hooks for further processing is not yet available. Prior attempts to identify hooks requiring special processing have involved manual identification. However, manual identification may be inefficient and expensive.

The conditions required for fusing commutator hooks vary depending upon the number of armature lead wires that are passed around a given hook. The fusing conditions must be tailored to the hook's winding configuration if a satisfactory fusion joint is to be formed. For example, a hook with a single wire passed around it will require a different electrode displacement, electrode force, and electric current application than a hook with two wires passed around it. The hook wrapped with two wires may require additional electrode force to produce a cohesion joint of satisfactory quality.

Winding machines typically attach two armature lead wires to selected hooks during the termination stages of armature winding. At the instant a hook is wrapped with two wires, the armature has a precise, known angular position. Thus, it would be possible to transfer a wound armature to a fusing machine while in a known angular position. The hooks wrapped with two wires could be recognized by their angular position and appropriately processed. However, such a solution requires costly changes to the transfer solutions between the winding and fusing machines.

It would be desirable to provide a winding machine which deforms a hook requiring special processing, such as a hook wrapped with two wires, so that the hook may be identified during later stages of processing. It would also be desirable to provide a method for identifying such a deformed hook in the fusing machine for performing special operations.

SUMMARY OF THE INVENTION

In view of the foregoing, it is an object of this invention to provide a winding machine that selectively marks portions of a workpiece.

It is a further object of this invention to provide a method for identifying portions of a workpiece that require special processing.

It is another object of this invention to provide a method, that will not require changing the transfer function between workstations, for identifying portions of a workpiece.

It is another object of this invention to provide a method, for identifying portions of a workpiece, that will permit the workpiece to be transferred between workstations without regard to the workpiece's angular position.

These and other objects of the invention are accomplished by providing a winding machine which deforms preselected commutator hooks, yet does not deform other hooks. The machine deforms the hooks while the hooks are in a known angular position. Apparatus is provided, for processing the hooks after winding, which includes means for measuring either the hook deformation or the force exerted on a sensing member.

A machine for processing the hook, such as a fusing machine, is provided which includes a force transducer for measuring electrode pressure, and an encoder for accurately determining the electrode displacement. The electrode force and displacement measurements will vary, depending upon whether or not the electrode is operating on a hook that was deformed by the winding machine. A microprocessor-based control system receives force and displacement data from the load cell and encoder, respectively, and acts on a motor to modify those quantities. The microprocessor recognizes hooks that were previously deformed by the winding machine, and causes the fusing machine to execute a predetermined operation. The operation performed on a deformed hook may be different than the operation performed on a non-deformed hook.

The microprocessor stores a distinct, predetermined electrode displacement or force function for fusing each hook variation that the apparatus can process. Electrode position or force may be continuously measured and adjusted according to the appropriate function. The apparatus applies current to the electrode when the electrode has a predetermined displacement or force, and may vary the current application according to whether or not the hook under operation was deformed (marked) by the winding machine.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which:

FIGS. 2 and 3 are partial side elevational views of a commutator with a hook being wrapped with a lead wire by the winding machine of FIG. 1;

FIG. 4 is a partial side elevational view of the commutator and the hook of FIG. 3, after the lead wire is cut at a point between the hook and a gripper;

FIG. 4a is a partial bottom view of the hook of FIG. 4;

FIG. 5 is a partial side elevational view of a commutator with hooks that are wrapped with a single wire;

DETAILED DESCRIPTION OF THE PREFERRED EMBODIMENTS

Figure 1:
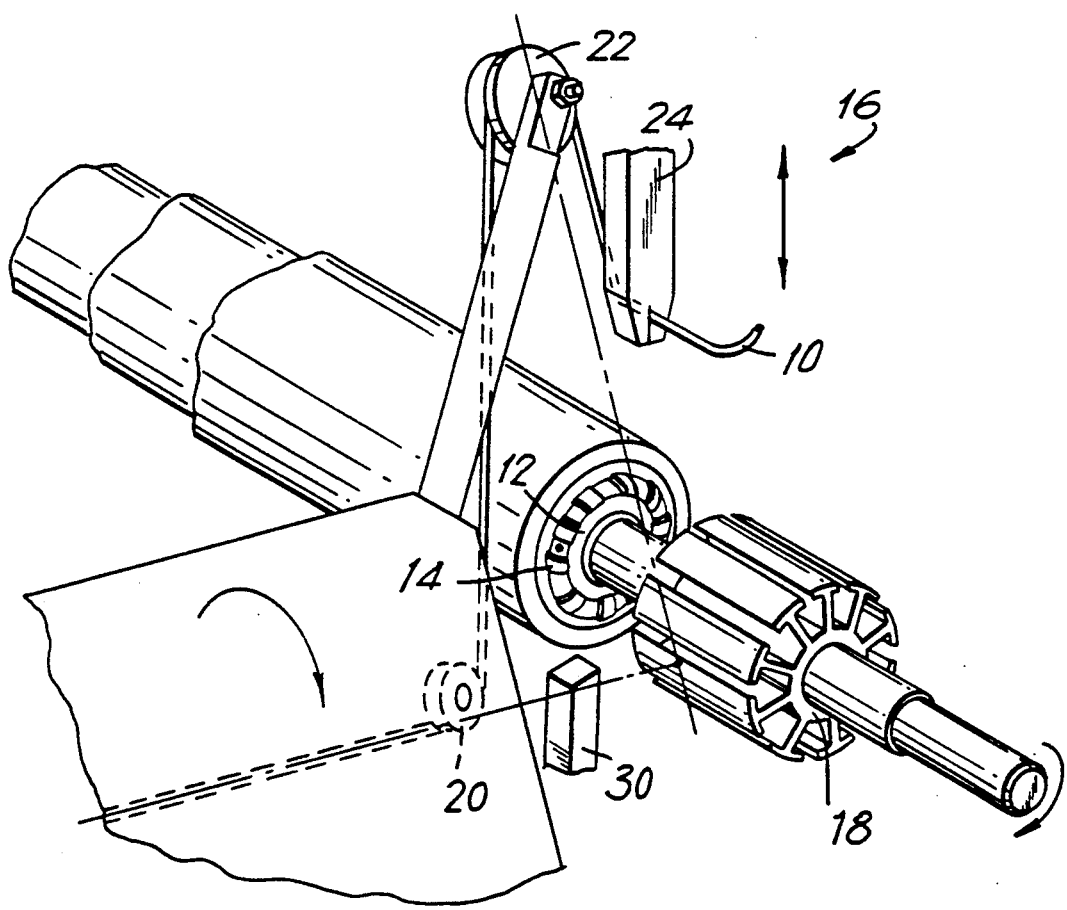
FIG. 1 is a partial perspective view of an illustrative embodiment of an armature winding machine in accordance with the present invention.
Figure 6:
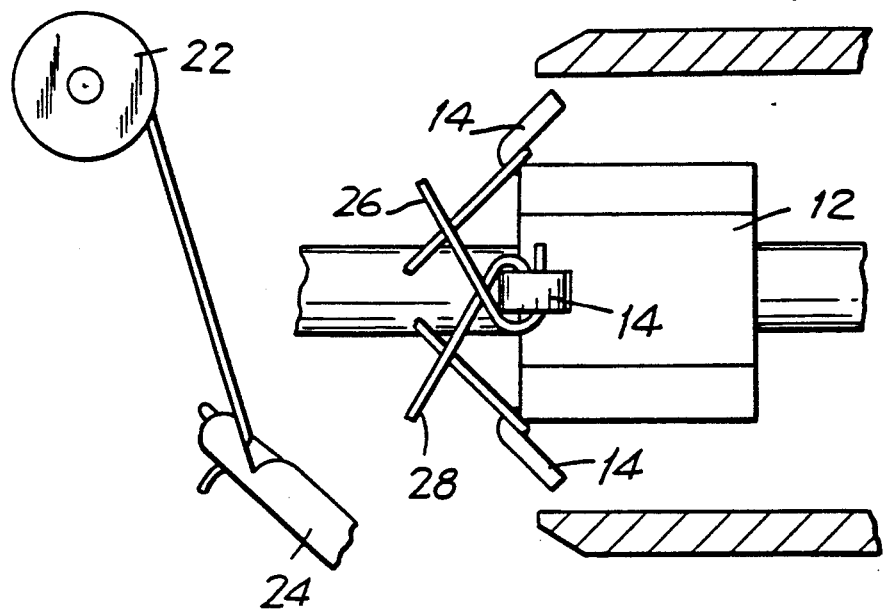
FIG. 6 is a partial side elevational view of a commutator with a hook being wrapped with a finish lead.

FIGS. 1-8 illustrate the process for winding a lead wire 10 of an armature to a commutator bar 12. Wire 10 is wrapped around a hook 14 on commutator bar 12. A two-flyer winding machine 16 (FIG. 1) removes wire 10 from a coil and passes it around hook 14.

An unwound armature 18 rests on winding machine 16 in winding receiving position. Wire 10 passes around a roller 20 and then around a flyer 22. Wire 10 stretches from flyer 22 to a gripper 24. Gripper 24 reciprocates during winding to draw wire 10 from a supply roll and over roller 20 and flyer 22. The gripper's reciprocating action attaches the wire lead to hook 14 (FIG. 2). Initial and final leads are attached to the appropriate hooks and then cut by the operation of flyer 22, gripper 24, a cutter, and other equipment.

A "start lead" 26 (FIG. 3) is attached to the armature around a first hook by rotation of flyer 22. Wire 10 is then cut (see FIGS. 4 and 4a) between hook 14 and gripper 24 (near the hook) to free gripper 24 and leave start lead 26 wrapped around the hook.

Flyer 22 and other equipment then operate to wind wire coils in the appropriate armature slots, and to loop the wire around the respective hooks. A single wire is passed around each hook (see FIG. 5) when the coils are being wound. The continuity of the wire is not interrupted.

When flyer 22 has completed winding all of the coils that must be wound, a stretch of wire extends from the flyer to the last wound coil. Flyer 22 and other equipment then operate to loop the finish lead 28 around the last hook (see FIG. 6). Gripper 24 grips the stretch of wire leading from the hook to the flyer, and the wire is severed at a point near the hook. A new armature may then be wound.

Figure 7A:
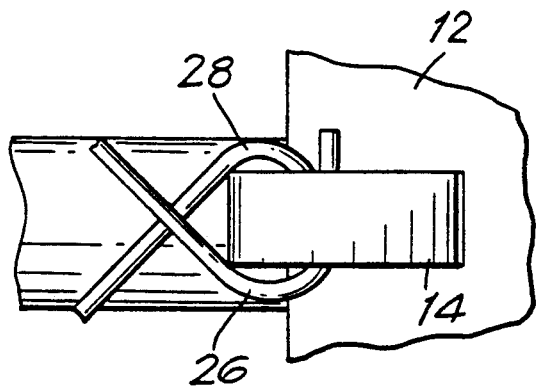
FIG. 7a is a partial side view of the center commutator hook of FIG. 6, showing the wrapping of the start and finish lead around the same hook.
Figure 7B:
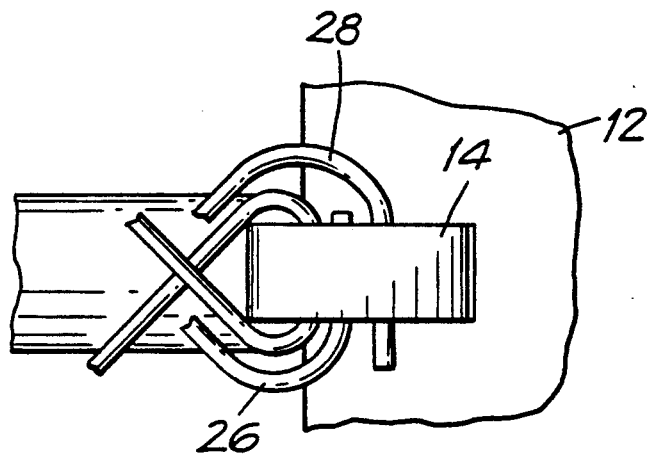
FIG. 7b is a partial side view of the center commutator hook of FIG. 6, showing the start and finish leads wrapped around a hook with an uninterrupted wire.

A second flyer and gripper pair (not shown) operate simultaneous to flyer 22 and gripper 24 to attach their respective start lead to the hook wrapped with finish lead 28 of flyer 22, and to attach their finish lead to the hook wrapped with start lead 26 of flyer 22. FIG. 7a shows the start and finish leads of the two flyers wrapped behind the same hook. The start and finish leads may be on a hook which is also wrapped with an uninterrupted lead (FIG. 7b).

Figure 8:
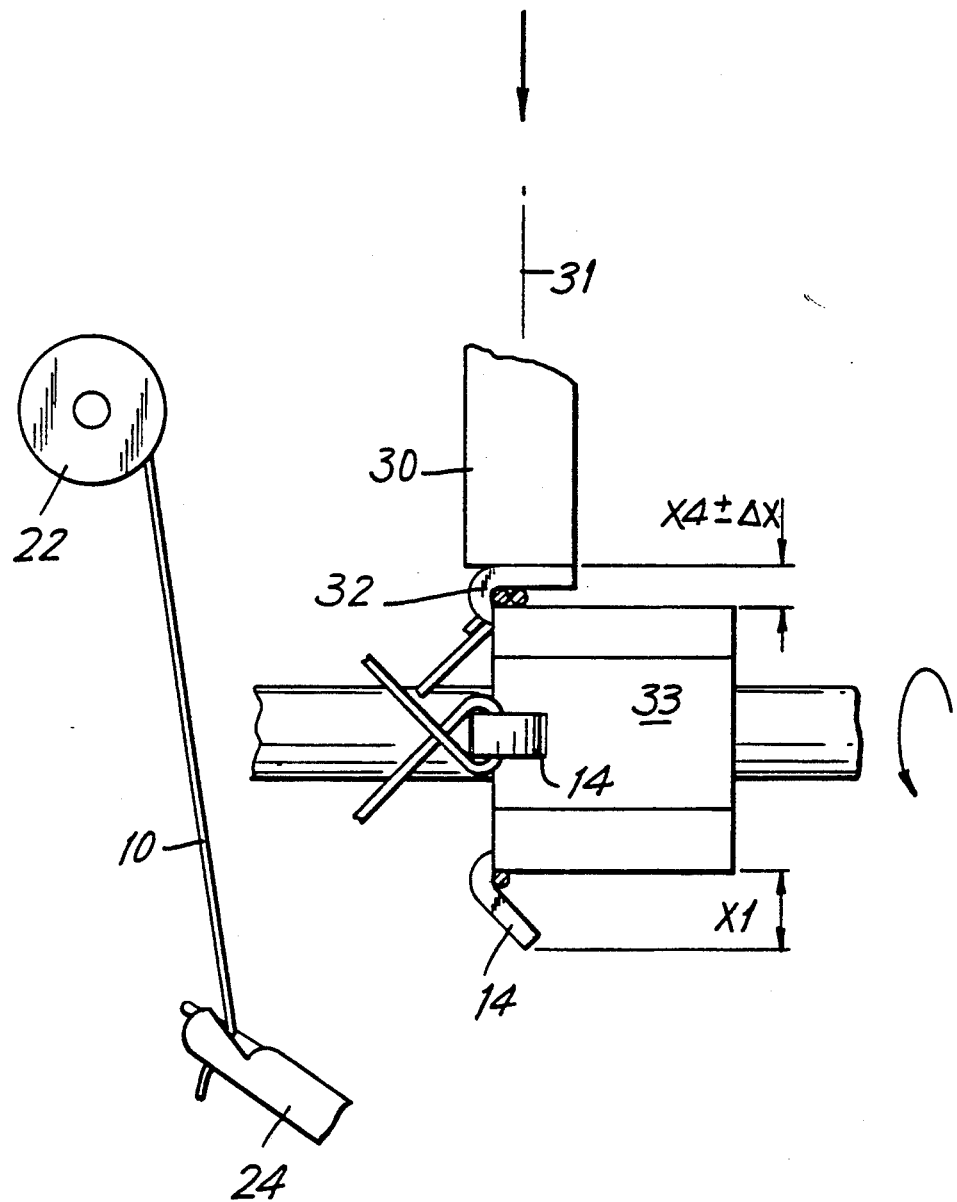
FIG. 8 is a partial side elevational view of a commutator having two hooks wrapped with a single wire, and one hook wrapped with two wires.

Referring now to FIG. 8, when the winding operation is complete, two or more of the commutator hooks will be wrapped with two wires. When this has been accomplished, the armature is rotated with the same equipment used to hold and rotate the armature during winding. The hooks wrapped with more than one wire are positioned under a deforming member 30. Deforming member 30 is displaced a predetermined distance along the deforming axis 31 to deform the hooks wrapped with two wires. Member 30 is driven by numerically-controlled axial actuators for high precision operations or when more than one deformed position is required. When less precision is required, conventional, less complex actuators can be used to drive deforming member 30. A plurality of deforming members may be used to increase operating speed. The deformed hooks 32 are bent towards the commutator bar 33.

Figure 9:
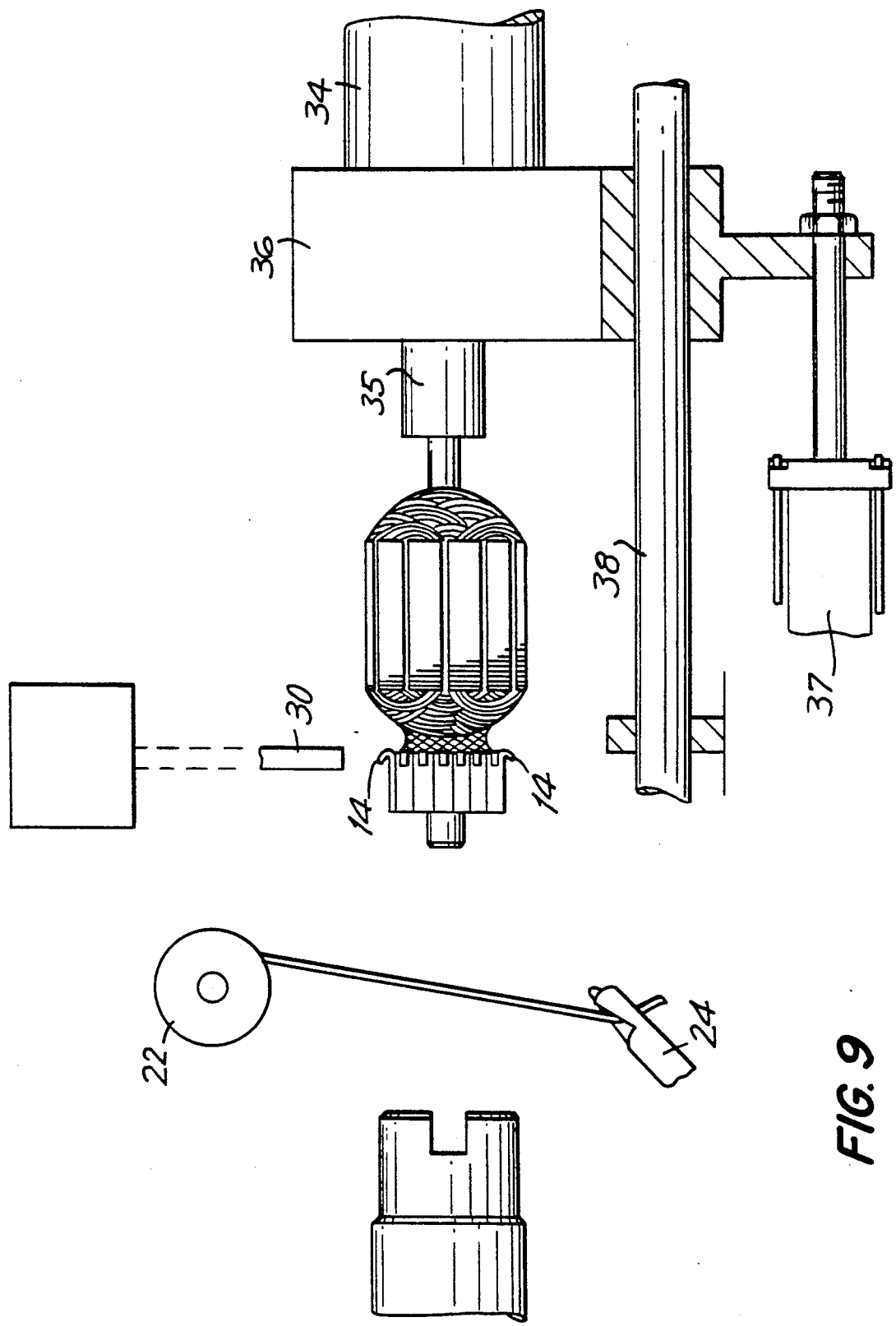
FIG. 9 is a side elevational view of an illustrative embodiment of apparatus of this invention for positioning an armature adjacent a deforming member.

Deforming member 30 typically may be part of the winding apparatus. Hook 32 may be deformed while still in its winding position with a known angular position. Alternatively, the deforming step may be performed by a machine (FIG. 9) that unloads the armature from winding machine 16 and places it on a transfer mechanism. The armature is removed from the winding machine and positioned beneath deforming member 30. An activator 34 controls a collet 35, which releasably holds the shaft of the armature in a known angular position. A shuttle 36 is moved by member 37 along guides 38 to withdraw the armature from winding machine 16, positioning the armature adjacent deforming member 30. After member 30 marks the appropriate hook, the armature may be transferred to other equipment for further processing.

The upper surface of deformed hook 32 has a different position, relative to commutator bar 33, than the upper surface of non-deformed hooks 14. Apparatus that is sensitive to force exerted on a translating member, or which can detect the displacement of a translating member along an axis of translation, is used to distinguish deformed hooks 32 (wrapped with several wires) from non-deformed hooks 14 (wrapped with a single wire). In this manner, subsequent processing equipment, such as a fusing machine, can automatically identify hooks wrapped with more than one wire.

The methods of the present invention for identifying hooks that have been deformed in accordance with the principles of this invention will now be described in the context of fusing operations. However, one skilled in the art will readily appreciate that the methods of this invention for marking and identifying hooks are readily adaptable for use with other types of processing equipment.

Distinguishing between the commutator hooks wrapped with more than one wire and hooks wrapped with a single wire enables the fusing machine to perform a different fusing operation on each type of hook. Deforming hooks during the winding operation offers the additional advantage of exerting additional pressure on the wrapped wires. This aids in holding the wires under the hook during subsequent transfer and handling of the armature.

Fusing machines capable of recognizing hooks deformed during the winding operation typically include one or more sensing elements. The sensing elements measure force exerted on a hook as a function of time or as a function of fusing electrode displacement. Alternatively, the sensing elements detect electrode displacement as a function of time or electrode force. Fusing apparatus suitable for this purpose is described in commonly owned, co-pending U.S. patent application Ser. No. 07/412,279, which is hereby incorporated by reference herein.

Once the hooks wrapped with one wire are differentiated from the hooks wrapped with two wires, the fusing operation may be tailored to the condition of the particular hook being fused. This permits a better fusion joint to be produced. To process the hooks differently, the heat (i.e., electric current) and force applied to the hooks, and the displacement performance of the electrode, are tailored to obtain the ideal fusing condition, which results in the correct electrical resistance and sufficient mechanical resistance of the connection. For example, a fusing electrode typically must generate more heat to fuse a hook wrapped with two wires in order to remove the greater quantity of wire insulation. The extra heat must be combined with the appropriate force and displacement performance of the electrode.

Figure 10:
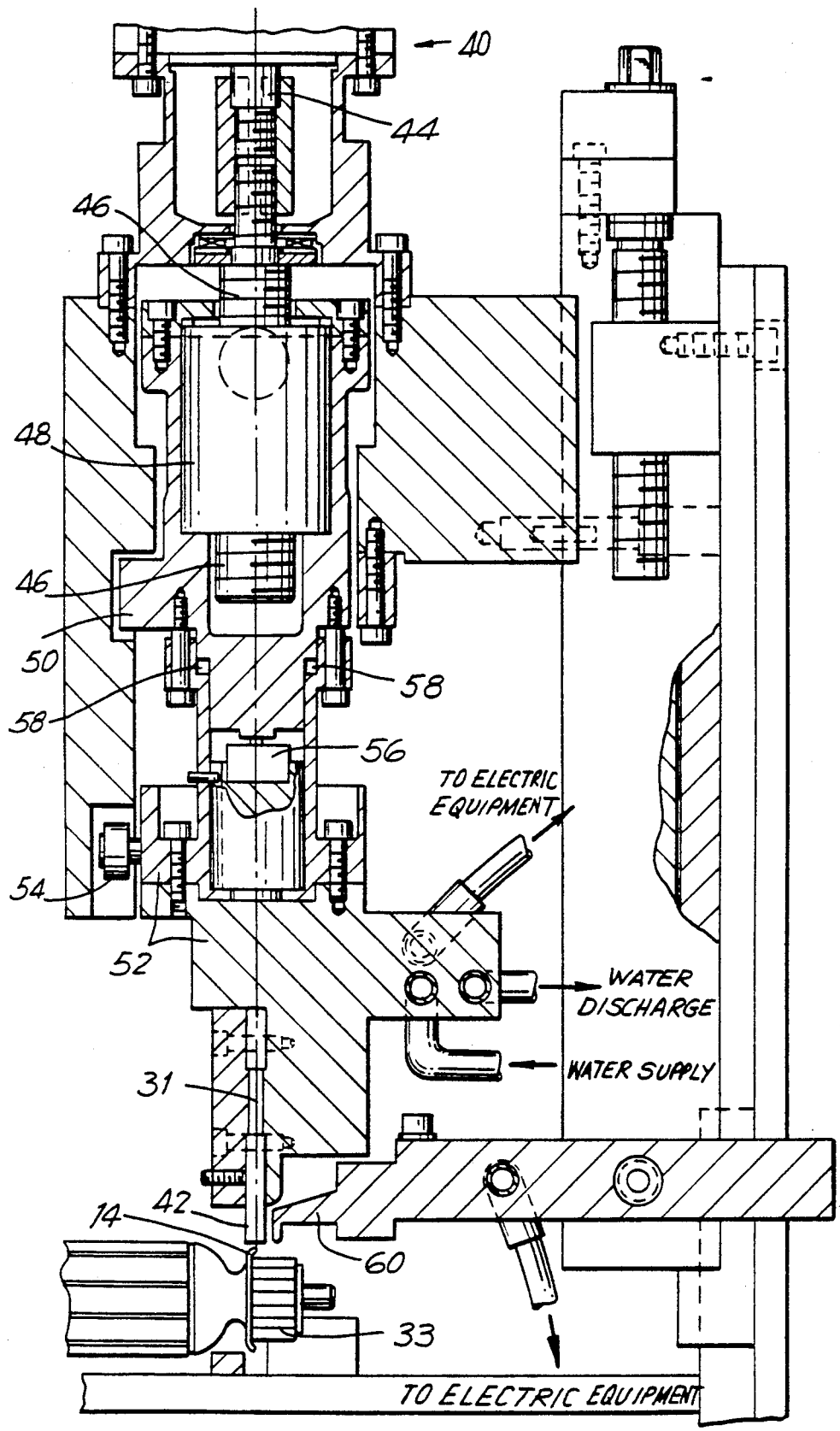
FIG. 10 is a cross-sectional view of an illustrative embodiment of a fusing machine constructed in accordance with the principles of this invention.
Figure 11:
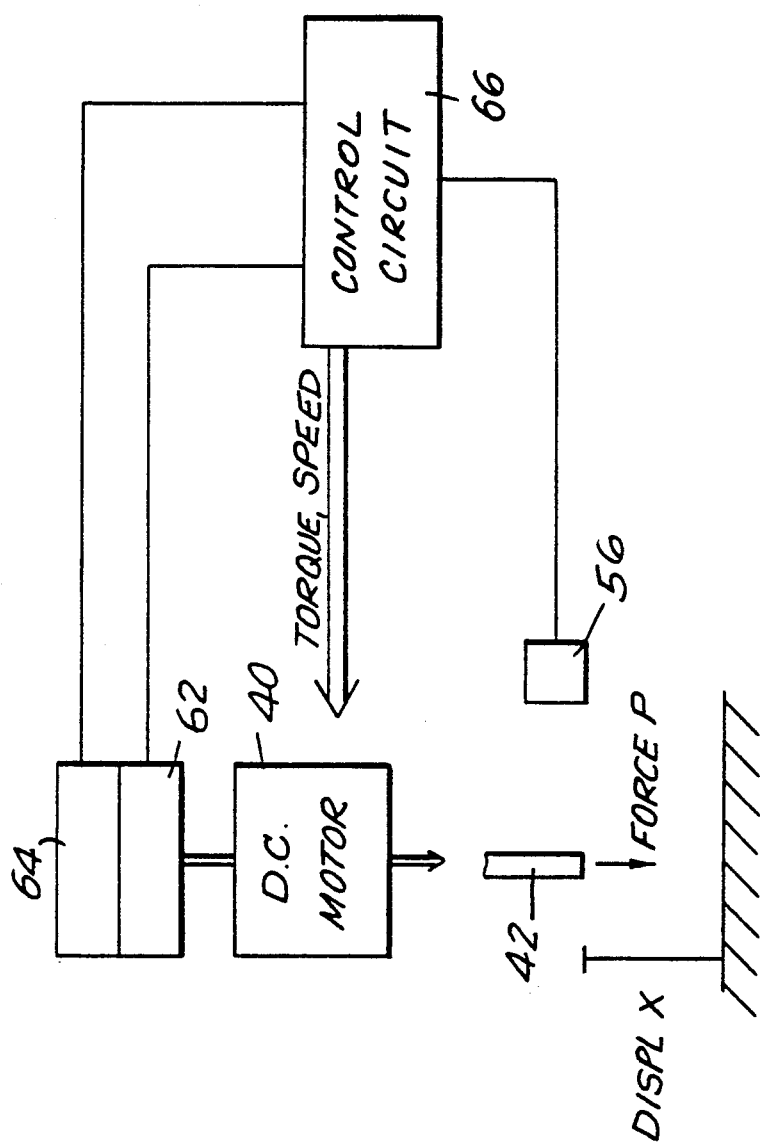
FIG. 11 is a schematic diagram of the feedback loop control system of this invention, which can be used in the fusing machine of FIG. 10.

Apparatus suitable for recognizing and fusing hooks according to this invention is shown in FIGS. 10 and 11. FIG. 10 shows a fusing machine in which the rotational motion of a motor 40 is converted into translational motion of fusing electrode 42 along axis 31. A rotation of motor output drive shaft 44 will cause a ball screw 46 to rotate. The engagement of ball screw 46 with sleeve 48 causes hollow member 50, hollow member 52, and electrode 42 to translate along electrode axis 31. A roller 54 maintains the alignment of hollow members 50 and 52 along axis 31. When electrode 42 encounters an opposing force exerted by a commutator hook 14 or 32, a force transducer, such as load cell 56, is compressed between hollow members 50 and 52. A space 58 allows hollow member 52 to translate along hollow member 50, and allows load cell 56 to deform correspondingly. A mass electrode 60 contacts the commutator during fusing to provide a current sink for electricity flowing from electrode 42.

By connecting motor 40, an encoder 62, a tachometer 64, and load cell 56 to a suitable microprocessor-based control circuit 66 (FIG. 11), the fusing machine can monitor and adjust the electrode displacement and force. The displacement is derived, using encoder 62, from the number of turns of motor drive shaft 44. Load cell 56 measures the force resistance against the electrode. Microprocessor circuit 66 acts in response to data received from either the encoder or the load cell. Microprocessor circuit 66 causes the motor to precisely lower (or raise) electrode 42. Alternatively, the microprocessor changes the field conditions of motor 40 to control the motor's torque. The apparatus can be used to implement the feedback loops shown in FIGS. 12 and 13, to distinguish deformed hooks from non-deformed hooks, and to perform a different processing operation on each type of hook.

Figure 12:
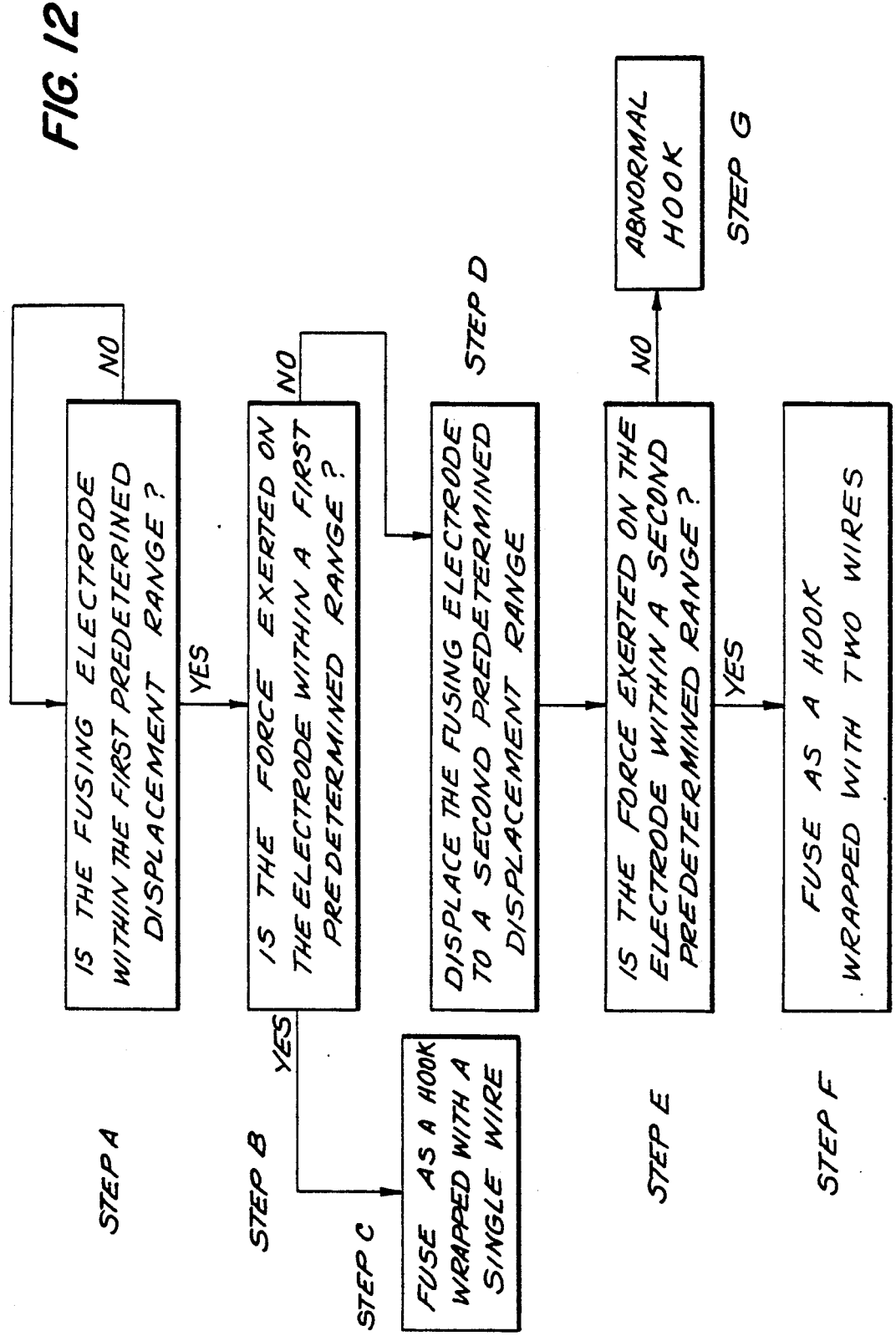
FIG. 12 a flowchart of a feedback loop for recognizing a previously deformed commutator hook.

Referring now to FIG. 12, a feedback measurement loop provides a means for displacing a fusing electrode of a fusing machine a predetermined distance, corresponding to a position slightly below the upper surface of a non-deformed hook (step A). The feedback loop then measures the force on the electrode (step B). If the electrode force is within a predetermined range, the hook is recognized as a hook wrapped with a single wire. The hook is then fused according to a predetermined electrical current application function and electrode force or displacement function (step C), e.g., as shown in copending U.S. patent application Ser. No. 07/412,279. If the electrode force is not in the predetermined range, the electrode is displaced to a second predetermined position, which corresponds to a position slightly below the upper surface of a hook deformed in accordance with this invention (step D). The electrode force is again measured (step E). If the electrode force is within a predetermined range, the hook is recognized as a hook wrapped with two wires. The hook and wires are then fused according to a predetermined electrical current application function and electrode force or displacement function (step F), e.g., see U.S. patent application Ser. No. 07/412,279. If the force is not in the predetermined range, the armature is rejected (step G).

Figure 13:
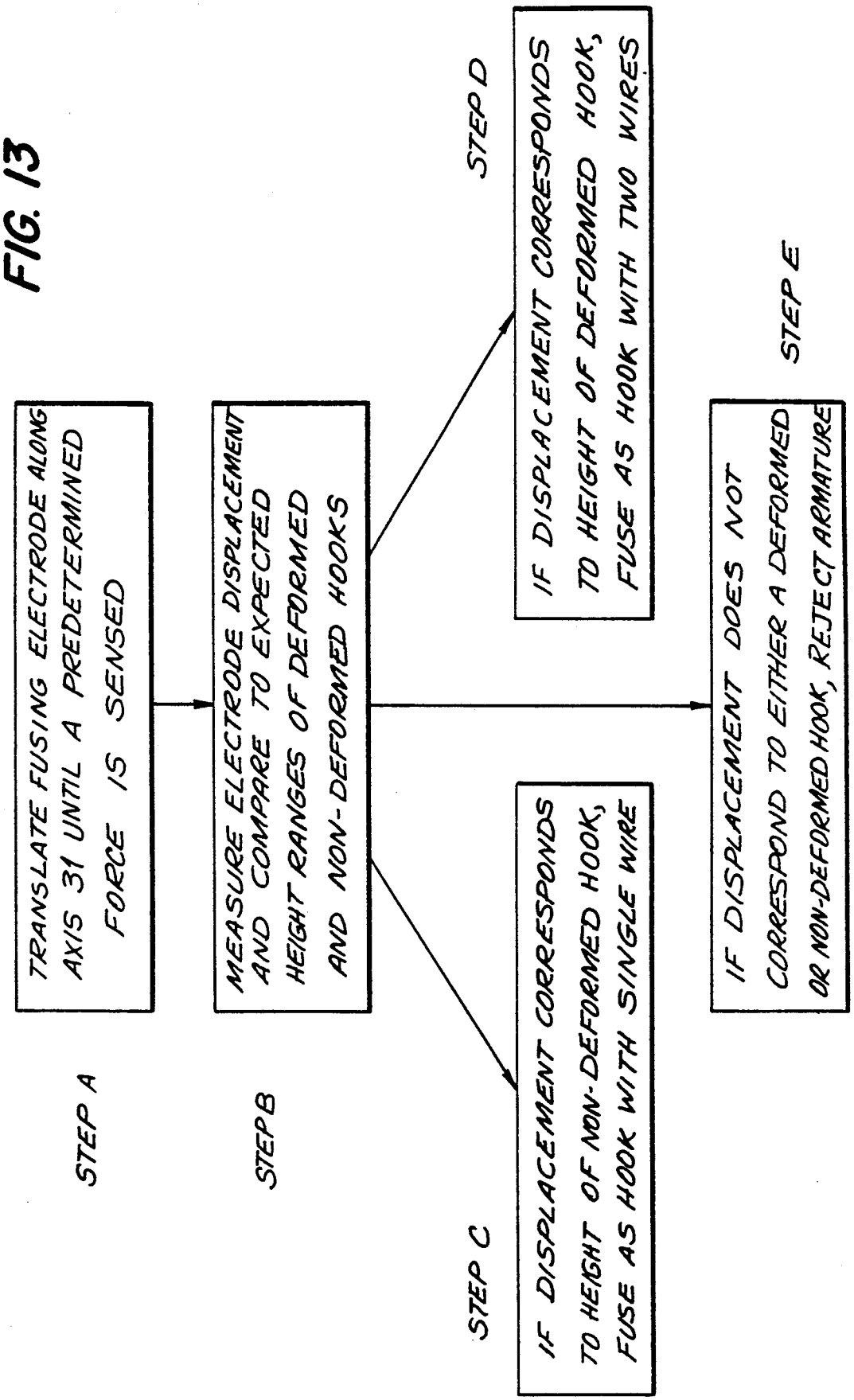
FIG. 13 is a flowchart of an alternative feedback loop for recognizing a previously deformed commutator hook.

Referring now to FIG. 13, a different feedback loop provides an alternative means for recognizing a deformed hook. A fusing electrode is translated along the electrode axis until it encounters a force resistance that is within a predetermined range, which corresponds to the electrode contacting the hook (step A). The feedback loop then measures the electrode displacement and determines whether the displacement corresponds to the expected height of the upper surface of a non-deformed hook, a deformed hook, or an abnormal hook (step B). If the electrode displacement corresponds to the height of a non-deformed hook, the hook is recognized as being wrapped with a single wire. The hook and wire are then fused according to a predetermined electrical current (heat) application function and electrode force or displacement function appropriate for fusing a hook wrapped with a single wire (step C). For example, the hook may be fused according to the method disclosed in U.S. patent application Ser. No. 07/412,279. If the electrode displacement corresponds to the height of a deformed hook, the hook is recognized as a hook wrapped with two wires. The hook is then fused using appropriate force, displacement, and electrical current (heat) application functions (step D), e.g., according to U.S. patent application Ser. No. 07/412,279. If the displacement does not correspond to the height of either a deformed or non-deformed hook, the armature is rejected (step E).

Figure 14:
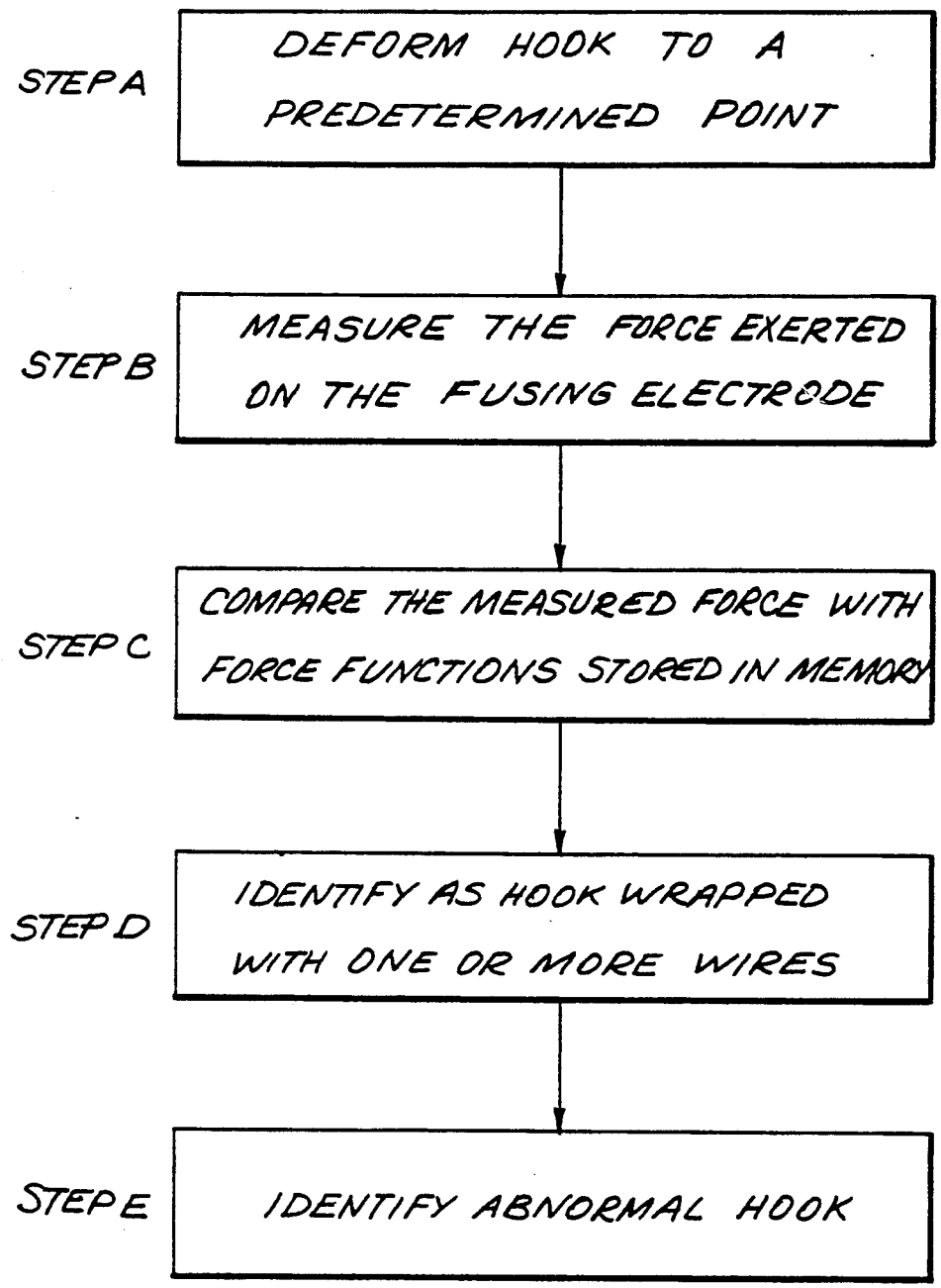
FIG. 14 is a flowchart illustrating a process for distinguishing between commutator hooks that have not been deformed during an earlier operation.

As an alternative to marking a hook by deformation, a hook wrapped with more than one wire may be recognized, and thereby distinguished from a hook wrapped with a single wire, by its response to electrode force and displacement when being deformed (see FIG. 14). For example, when the fusing electrode encounters the resistance of the two wires (step A), the force transducer will detect a greater force than normally detected for single wire hooks (step B). The measured force and displacement responses of a given hook are compared to predetermined functions (e.g., force functions) stored in the microprocessor circuitry, and the hook is identified as being wrapped with one or more wires, or as abnormal (steps C-E).

It will be understood that the foregoing is merely illustrative of the principles of the invention, and that various modifications can be made by those skilled in the art without departing from the scope and spirit of the invention. The scope of this invention is limited only by the claims that follow.

The invention claimed is:

1. In a method of making electric motor armatures having at least a first plurality of coils of wire wound on a substantially cylindrical armature core so that lead wires of each coil pass through predetermined ones of a plurality of structures on said armature, said structures being circumferentially spaced from one another around said core and initially substantially identical to one another except that a first one of said structures has more wires passing through it than at least one second one of said structures has, said structures being fused to the wires passing through them after all of said coils have been wound on said armature in order to ensure electrical contact to the coils, the improvement comprising the steps of:

deforming a selected one of said first and second structures in a predetermined way to distinguish the deformed structure from those of said structures which have not been similarly deformed, said deforming being performed after the deformed structure has received its lead wire or wires but before any of said structures have been fused;

after all of said coils have been wound and said deforming has been performed and when said structures are to be fused, detecting whether a structure has been deformed in said predetermined way; and fusing the structure which has been subjected to said detecting step to the wire or wires passing through it using a fusing operation which varies depending on whether or not said structure has been detected to have been deformed in said predetermined way.

2. The method defined in claim 1 wherein said structures are commutator tangs.

3. The method defined in claim 2 wherein said commutator tangs initially project radially outward from said core, and wherein said deforming step deforms a commutator tang radially inward from the initial position by a predetermined amount.

4. The method defining in claim 3 wherein said fusing step deforms a commutator tang radially inward against said core.

5. The method defined in claim 1 wherein said deforming step is performed in a first machine station where said coils are wound on said core, wherein said detecting and fusing steps are performed in a separate second machine station, and wherein the substantially sole technique for angularly orienting said armature between said first and second stations is the deformation of said selected one of said first and second structures.

6. In apparatus for making electric motor armatures by winding at least a first plurality of coils of wire on a substantially cylindrical armature core so that the lead wires on each coil pass through predetermined ones of a plurality of structures on said armature, said structures being circumferentially spaced from one another around said core and initially substantially identical to one another except that a first one of said structures has more wires passing through it than at least one second one of said structures has, said structures being fused to the wires passing through them after all of said coils have been wound on said armature in order to ensure electrical contact to said coils, the improvement comprising:

means for deforming a selected one of said first and second structures in a predetermined way to distinguish the deformed structure from those of said structures which have not been similarly deformed, said means for deforming operating on the deformed structure after the deformed structure has received its lead wire or wires but before any of said structures have been fused;

means for detecting whether a structure has been deformed in said predetermined way, said means for detecting being employed after all of said coils have been wound and said means for deforming has operated and when said structures are to be fused; and means for fusing the structure which has been operated on by said means for detecting to the wire or wires passing through that structure using a fusing operation which varies depending on whether or not said means for detecting has determined that said structure has been deformed in said predetermined way.

7. The apparatus defined in claim 6 wherein said structures are commutator tangs.

8. The apparatus defined in claim 7 wherein said commutator tangs initially project radially outward from said core, and wherein said means for deforming deforms a commutator tang radially inward from its initial position by a predetermined amount.

9. The apparatus defined in claim 8 wherein said means for fusing deforms a commutator tang radially inward against said core.

10. The apparatus defined in claim 6 wherein said means for deforming is disposed at a first station in said apparatus where said coils are wound on said core, wherein said means for detecting and said means for fusing are disposed at a separate second station in said apparatus, and wherein the deformation of said selected one of said first and second structure is substantially the sole means for angularly orienting said armature between said first and second stations.

* * * * *